D. DALZELL.
Improvement in Axle-Boxes for Vehicle-Wheels.
No. 128,861. Patented July 9, 1872.
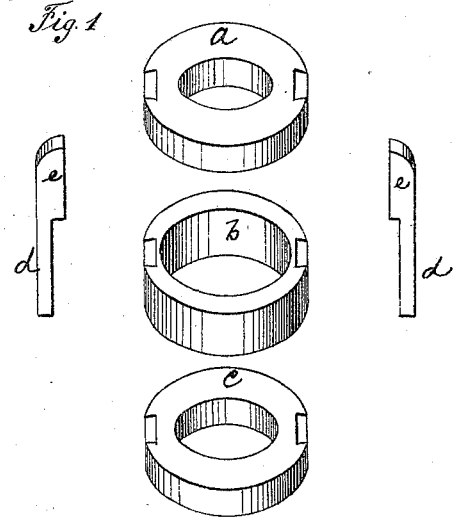
WITNESSES:
INVENTOR:

UNITED STATES PATENT OFFICE.

DAVID DALZELL, OF SOUTH EGREMONT, MASSACHUSETTS.

IMPROVEMENT IN AXLE-BOXES FOR VEHICLE-WHEELS.

Specification forming part of Letters Patent No. 128,861, dated July 9, 1872.

Specification describing a certain Improvement in Axle-Boxes, invented by DAVID DALZELL, of South Egremont, in the county of Berkshire and State of Massachusetts.

This invention relates to an axle-box whose head is composed of rings of different thicknesses, as many in number as the sections of different diameters in the bore of the box, said rings being bound together by tie-pieces inserted in grooves running crosswise of the rings at opposite sides of the head, and projecting beyond the inner end of the head far enough to embrace the inner end of the box and form the ears which prevent the box from turning in the hub.

Figure 1 is a perspective view of the box, rings, and tie-pieces, all separate; and Fig. 2 is a transverse vertical section of the same put together.

A is the box aforesaid, the same being composed of a suitable piece of pipe. The head B is made up, in this instance, of three separate rings of different thicknesses, $a\ b\ c$. I do not, however, limit myself to any particular number of rings. It is only necessary that there should be as many as there are sections of different diameters in the bore of the head, because, by using rings, these sections are formed without the labor of turning out the inside of the head. The middle ring has the largest bore, so as to form a groove in the inside of the box to contain oil for lubricating the axle-arm. The rings are punched by machinery and formed with dovetail grooves of the same dimensions running crosswise of their opposite sides, in which grooves are inserted tie-pieces $d$, which bind the rings together, and, projecting past one end of the head B, form the ears $e$, between, and touching, which the inner extremity of the box A is placed, the same abutting againt the side of the ring $a$. The box, rings, and tie-pieces are then brought to a suitable degree of heat, and then subjected, by any sufficient means, to a pressure powerful enough to combine them as in a solid piece, by butt-welding, in a very expeditious and perfect manner. The article is then ready for finishing and tempering to a proper degree of hardness.

I claim as my invention—

The head B made of rings of different thicknesses, arranged so as to form a groove in the inside of the head to contain a lubricant, and combined with the tie-pieces $d$, ears $e$, and box A, substantially as specified.

DAVID DALZELL.

Witnesses:
A. BRANCH,
D. DALZELL, Jr.